United States Patent [19]

Larson et al.

[11] 4,339,657

[45] Jul. 13, 1982

[54] ERROR LOGGING FOR AUTOMATIC APPARATUS

[75] Inventors: David D. Larson, Boulder, Colo.; Stanley T. Riddle, Tucson, Ariz.

[73] Assignee: International Business Machines Corporation, Armonk, N.Y.

[21] Appl. No.: 118,953

[22] Filed: Feb. 6, 1980

[51] Int. Cl.[3] .......................... G06F 7/62; G06F 7/02

[52] U.S. Cl. .......................... 235/92 QC; 235/92 SB; 235/92 CA; 355/14 CU; 371/5; 364/900

[58] Field of Search ......... 235/92 QC, 92 SB, 92 EC, 235/92 PE, 92 CA; 364/900 MS File; 355/14 R, 14 C, 14 CU; 371/5, 25

[56] References Cited

U.S. PATENT DOCUMENTS

| | | | |
|---|---|---|---|
| 2,679,355 | 5/1954 | Savino . | |
| 3,342,981 | 9/1967 | Laishley | 235/92 QC |
| 3,408,486 | 10/1968 | Becker, Jr. . | |
| 3,704,363 | 11/1972 | Salmassy . | |
| 3,746,981 | 7/1973 | Stone . | |
| 4,062,061 | 12/1977 | Batchelor . | |
| 4,145,743 | 3/1979 | Diciurcio . | |

*Primary Examiner*—James D. Thomas
*Attorney, Agent, or Firm*—Carl M. Wright

[57] ABSTRACT

Method and apparatus for improved error logging by integrating errors over a given number of operations that provides long memory and fast recovery. Errors integrated over a selected number of associated operations are compared to a criterion. An exception is logged each time the number of errors is not less than the criterion but if the number of errors is less than the criterion, the exception log is cleared.

4 Claims, 8 Drawing Figures

ERROR LOGGING FOR AUTOMATIC APPARATUS

DOCUMENTS INCORPORATED BY REFERENCE

U.S. Pat. No. 4,170,414 (assigned to the same assignee as the present case) is incorporated by reference and hereinafter referred to as Reference '414.

TECHNICAL FIELD

This invention relates to error logging particularly to logging errors of a transient nature.

The proper analysis of machine errors provides an early indication of machine malfunctions. For example, when a part wears beyond its tolerance, it begins to cause malfunctions which increase in frequency until there is a complete breakdown. Some machine errors occur, however, which are not caused by machine failures but rather by improper input material or operator error. These errors are of a transient nature and tend to disappear over a period of time. Logging of such errors can provide a misleading indication which increases maintenance cost because of the unnecessary replacement of parts and the use of the maintenance personnel time.

An example of such errors is paper handling errors that occur in copier systems. A special error logging for paper handling errors is desirable for several reasons. Paper handling errors are more prevalent than others and have a wider variety of causes. One cause is the sensitivity of paper handling systems which must be designed to handle a wide range of paper types and sizes. Another cause is the variance of paper quality and changes in characteristics caused by varying humidity. Another cause is the operator's failing to observe certain precautions or not following instructions. Paper handling errors have an erratic occurrence with long periods of no errors and many errors in a short period.

Errors can be integrated over a period of time determined by the number of attempts to perform an event. In the paper handling case, for example, the errors might be integrated over every one thousand paper commands. If paper handling errors are being caused by a faulty ream of paper, it would be characteristic that a number of errors would occur over a short period of time followed by a period of no errors after a ream of good paper was loaded in the machine.

It is undesirable for such transient errors to accumulate over a period of time because they provide misleading indications of machine performance. It is, therefore, desirable to have an error logging scheme which integrates errors over a period of time and which has a long memory and short recovery period.

BACKGROUND ART

A defect monitor is shown in U.S. Pat. No. 3,408,486 which utilizes a reversible counter for counting up when counting rejects and for counting down when counting nondefectives. For the purposes discussed above, the system according to the patent recovers too slowly and provides only a short history of defective items.

An error log system for electrostatographic machines is shown in U.S. Pat. No. 4,062,061. A fault flag array is scanned, having a flag associated with each operating component so that in case of failure, a cumulative error count related to each flag is incremented. Such an error logging system merely counts the number of errors and does not provide for integration or recovery.

DISCLOSURE OF THE INVENTION

In accordance with the invention, a control system, supplying command signals to initiate system functions and having means for producing error signals that indicate malfunctions of the system, provides a control signal after a given number of command signals have been supplied. An error counter responds to error signals to provide a count value representing the total number of error signals which have occurred. There is also provided a sensing means that produces a value signal when the error count exceeds a given value. An exception counter is incremented by the control signal whenever the value count signal is present and resets the exception counter when the value signal is not present.

DESCRIPTION OF THE PREFERRED EMBODIMENTS

Two types of machine failures can be considered—hard failures and soft failures. A hard failure is considered to be of the type which requires an immediate stop of the machine and the intervention of an operator or service personnel to correct the cause before the machine can be restarted. In a copier system, for example, a hard error would be a paper jam which leaves papers in the paper transport path. A soft failure is one which does not require the machine to stop but which allows the machine to continue by retrying the failed event. An example of a soft error is a failure to feed a copy sheet in a copier system, a failure which can be ignored and retried a given number of times. Such an error can be caused by improper paper, improper paper handling such as failure of the operator to align the paper, and so on, and not a malfunction of the machine per se.

The logging scheme to be disclosed counts exceptions. The exception count is the number of consecutive times that the error count, accumulated over a given number of operations, exceeds a given criterion. The number of operations is called an accumulation interval and may be different for each error.

An error count is provided, of course, for each type of error expected to be encountered or of interest. The errors are not accumulated during maintenance activities unless specifically activated. In one embodiment, it will be seen that when the exception count reaches fifteen, it is frozen.

Figure 1:
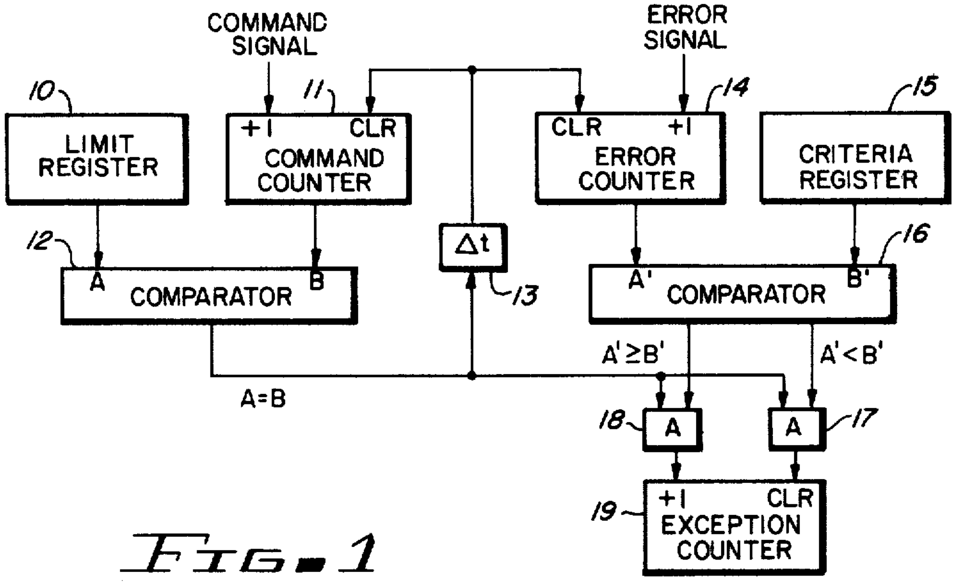
FIG. 1 is a block diagram illustrating an embodiment of the invention.

In FIG. 1, a limit register 10 contains the given number of operations over which the errors are to be accumulated. A counter 11 is incremented by each command signal and its count is compared with that of the limit register 10 in a comparator 12.

A criterion register 15 holds the criterion value and an error counter 14 accumulates the number of errors associated with the command signal. A second comparator 16 compares the value of the error counter 14 with that of the criterion register 15 and produces an output signal when the error count is not less than the value in the criterion register and another signal when it is.

The output signal from the comparator 12 is generated when the command counter value is equal to the value in the limit register 10. The equality signal (control signal) from the comparator 12 primes two AND gates 17 and 18 which have as their other input the two signals from the comparator 16, respectively.

If the error count value is not less than the criterion value, the AND gate 18 is activated, incrementing an exception counter 19. If the error counter value is less than the criterion value, the AND gate 17 is activated, clearing the exception counter 19.

A delay device 13 provides a reset signal for the command counter 17, and the error counter 14 after each accumulation interval.

An exception counter according to the invention has been described in connection with FIG. 1. The logic devices represented by the blocks are commercially available and well known to those of ordinary skill in the art.

In a computer controlled environment, however, it is desirable to practice the invention using a general purpose programmed computer or microprocessor. For example, where the machine control is accomplished by a programmed processor, the above-described logging routine according to the invention is preferably practiced using the same processor.

Figure 2:
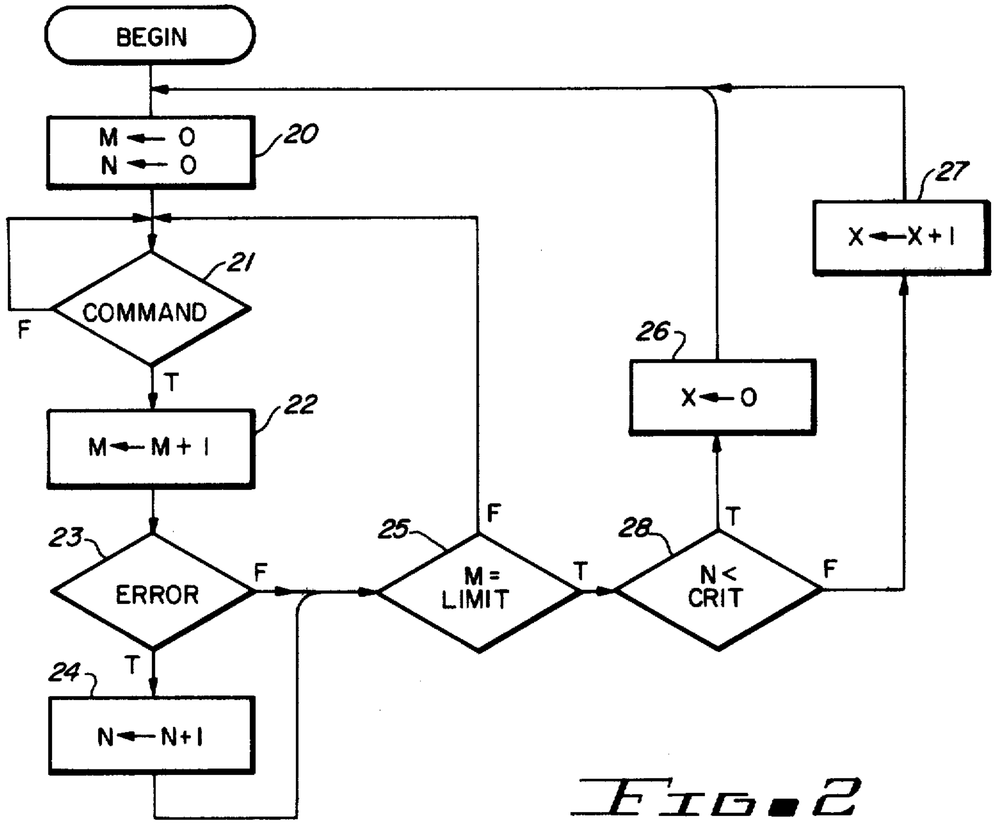
FIG. 2 is a flowchart outlining the operation according to the invention.

FIG. 2 is a flowchart depicting the sequence of steps of the invention.

At the step 20, two counters M and N are reset to zero. The counter M represents the command counter and the counter N represents the error counter. At the step 21, a check is made to determine whether a command has issued. If not, the check step is repeated. When a command has been issued, the step 22 is performed which increments the command counter M by a value of one. At the step 23, a determination is made whether an error occurred. If so, at the step 24 the error counter N is also incremented by one. If no error occurred or after the error counter has been incremented, at the step 25, a determination is made whether the command counter value M is equal to a limit value. If not, the program returns to the step 21. If the limit of the command counter M has been reached at the step 25, then at the step 28, a determination is made whether the value of N, the error count, is less than the criterion. If so, then at the step 26, the exception counter is cleared to zero. On the other hand, at the step 28 if the value of the error count N is not less than the criteria, then at the step 27, the exception counter is incremented by a value of one. After the steps 26 and 27, the program returns to the step 20, clearing the command and error counts and repeating the process described above. The program of FIG. 2 is suitable for a single error counter. An actual machine, however, usually requires the logging of several different types of errors. This requires interaction and also requires that the error logging be arranged so that the machine can continue to control the machine. Therefore, the program is divided into two separate routines called CELOG and CEXCHK, the former for logging the errors and the second for maintaining the counts and checking the errors. The first routine, CELOG, is flowcharted in FIGS. 6, 7 and 8 and shown in detail in the following program Table I.

Reference '414 shows the details of a microprocessor suitable for incorporating the invention in the form to be described. The reference and the Appendix A provide the necessary detail to enable a person of ordinary skill in the art to practice the invention as disclosed.

The CELOG routine logs all the identified machine error conditions into the memory for use by the second routine. The CELOG routine is called with the error number to be logged in the low byte of the accumulator. If logging is active, this number is used to construct the address of the status log control table entry associated with the error number. As noted above, logging is inactive in the CE or maintenance mode unless specifically activated.

If the error is a paper handling error, and therefore among the first entries in the table, a counter associated with this error is incremented once for each occurrence of that error in the accumulation period until fifteen occurrences have been logged at which point the counter is frozen. Separate counters are maintained by this program for hard and soft error conditions.

If the error is a history error (or in another embodiment, a nonpaper handling error), it is logged in a six-deep history stack, that is, a last-in/first-out register with a maximum of six locations which implies that only the last six errors are available in the stack. The history stack is over-log protected. An error will not be logged two or more times in a row unless there have been fifteen intervening attempts to log that error. The over-log protection is reset when the current error is different from the previous error number. All errors are logged in another six-deep error stack having no over-log protection. The last attempted log error number is always saved even when logging is inactive or if the error number is invalid.

If an interrupt occurs during an error log and, during the interrupt another call to the program is made, the first error number is saved and the logging of the original error continues after the interrupt. When the first log is completed, the interrupt error is processed. This interrupt protection is valid only from certain modules which are not essential to an understanding of the invention.

The status log control table used with the program to be explained below have entries as follows. In the first byte, the bits zero and one identify counters associated with the error to be logged. Bit two is not used. Bit three is used, when set, to indicate that an alternate criterion byte is available in the memory. That is, more than one criterion can be used, the table entry indicating when the alternate criterion is active. The fourth bit, when set, indicates that an error message associated with the error to be logged is in the special message table. The fifth bit indicates, when set, that the error is a paper handling error; bit six, a soft error; and bit seven, a hard error.

The second byte gives the relative address of the error message associated with the error.

The third byte is the relative address of the log counter associated with the error. This byte forms the lower byte of the complete address of the counter, the other address portion being supplied by bits zero and one of the first byte as noted above.

The fourth byte is divided into two hexadecimal characters, the low order indicating the number of 256 copy attempts between exception updates. The high order hexadecimal digit is the criterion to be used in exception updating, unless an alternate criterion has been specified. If an error can be either hard or soft, the soft error limit and criteria are defined in this byte which apply only to the first (hard) error type.

The fifth byte operates the same as the fourth byte except it pertains to the second type of error.

The counters in the memory for logging the error occurrences and count exception are organized as follows. The first byte is divided into two hexadecimal digits, the low digit being the exception counter for a soft error and the higher digit being the error occurrence counter for a hard error. Bit three of this byte is set if alternate criterion have been established for the associated error.

The second byte is organized the same as the first byte but related to the hard error type. The third byte contains the alternate criterion, the lower hexadecimal digit being the altered criterion for the first error type and the high order digit, for the second error type.

The abbreviations used are identified in Appendix B.

Figure 8:
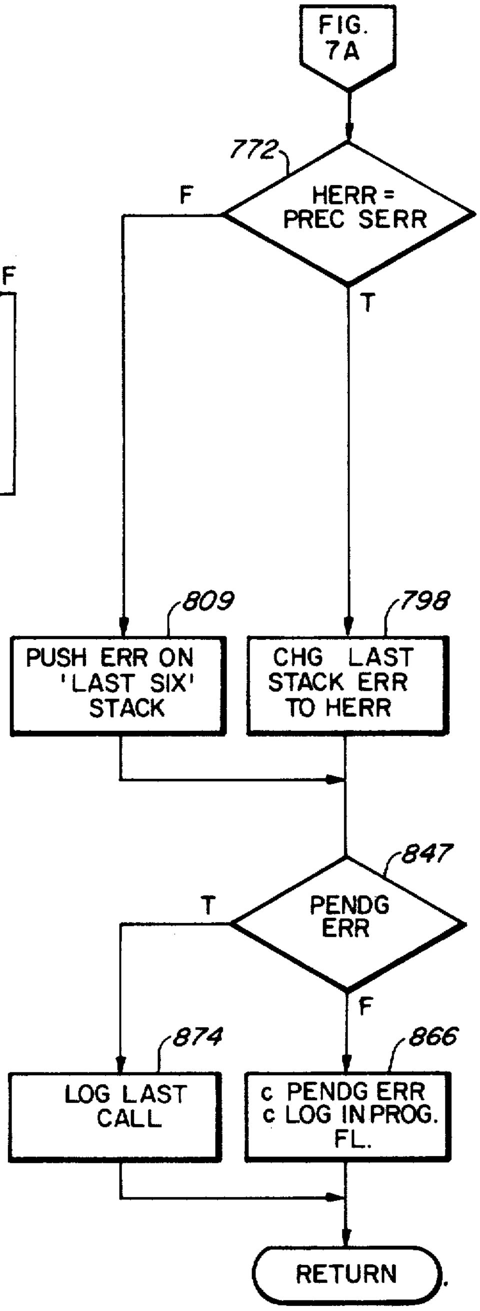

The reference numerals of the steps in the following flowcharts relate to corresponding line labels in the program tables. The reference numerals in FIGS. 6, 7 and 8 are independent from those in FIGS. 3, 4 and 5.

Figure 6:
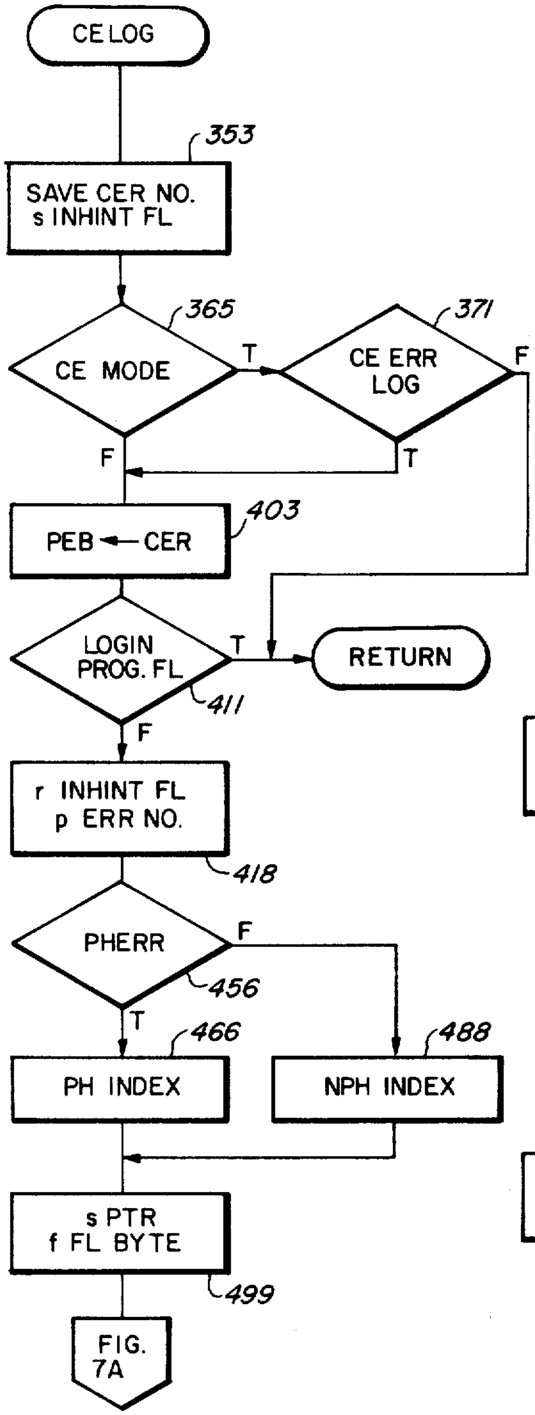
FIGS. 6, 7 and 8 are flowcharts showing a second routine for implementing the invention.
Figure 7:
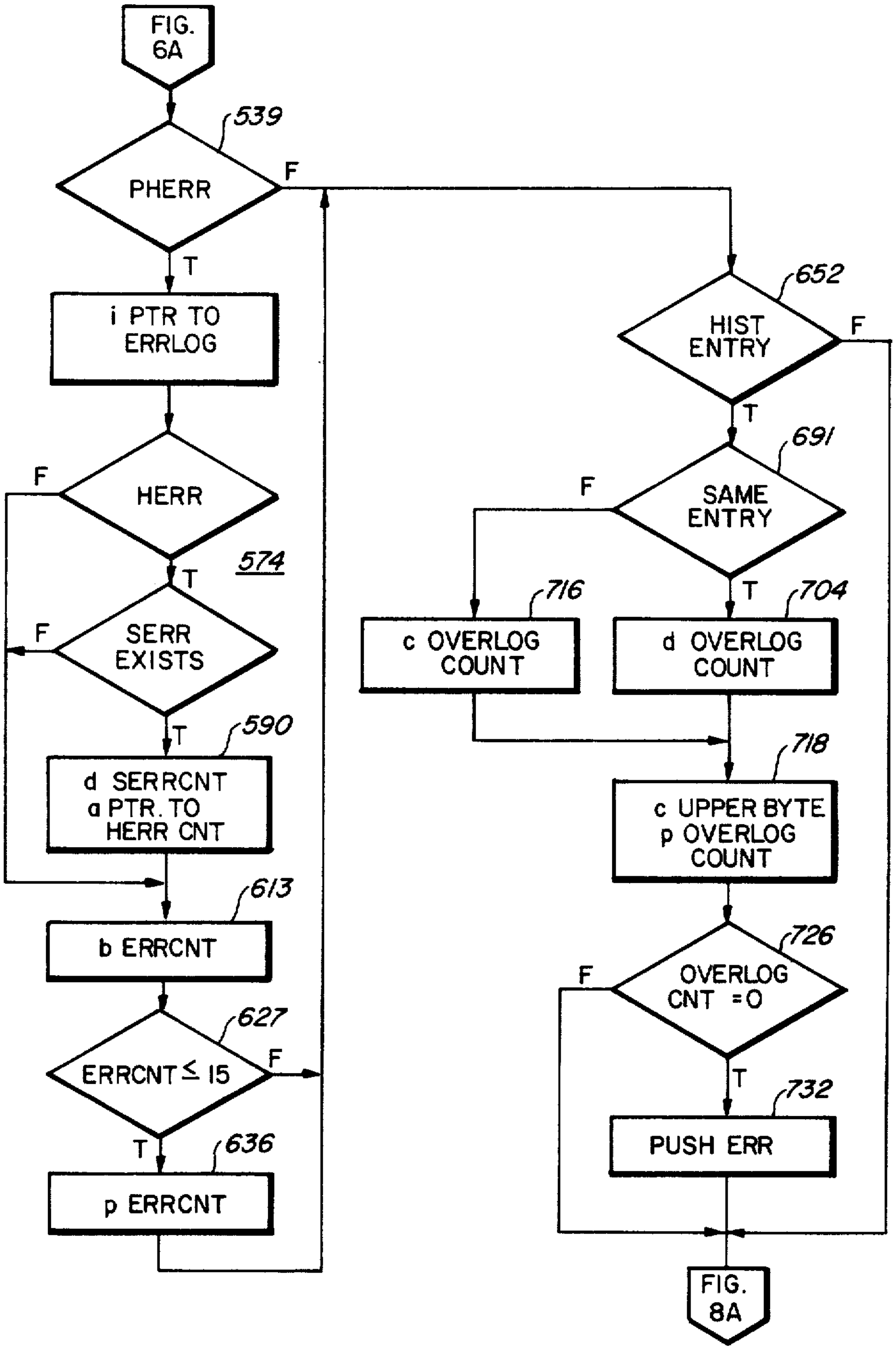

In FIG. 6, the first step 353 of the routine saves the current error number and sets the inhibit interrupt flag. Next, the step 365 tests to determine whether the maintenance mode is active. If so, the step 371 determines whether the error log is to be active. If not, the routine is exited; otherwise, the program resumes at the step 403 where the current error number is transferred to the pending error byte.

Next, by the step 411 it is determined whether a log is in progress by checking the pending error register for a nonzero value. If another log is in process, the new error number is saved and the routine is exited; otherwise, the program continues at the step 418 where the inhibit flag is reset and the error number is stored.

At the step 456, it is determined whether the error is a paper handling error. If not, then at the step 488, the index is set up for a nonpaper handling error; otherwise, at the step 466, the index is set up for a paper handling error. Next, the step 499 sets the pointer and fetches the flag byte.

The connector indicates that the program continues on FIG. 7 where at the step 539 a branch is taken depending on whether the error was a paper handling error. In the case of a paper handling error, the pointer to the error log which was set at the previous step 499, is incremented by the step 548. If this is a hard error and a soft error exists, as determined by the steps 574, the soft error count is decremented and the pointer is advanced to the hard error counter. If the steps tested in the step 574 are not true, the step 590 is skipped and the step 613 is performed to increment the error count.

The step 627 determines whether the error count is not greater than fifteen. If so, then at the step 636, the error counter is stored. Thus, if the error count has reached fifteen, the count is frozen.

After the error count has been taken care of, the program continues with the step 652 and the previous steps would have been skipped if not a paper handling error as determined by the step 539. The step 652 determines whether the error should be stored in the history file. If not, the program continues at the location indicated in FIG. 8. Otherwise, the history entry is checked by the step 691 to see whether it is the same entry. If not, then by the step 716 the over-log count is cleared to zero; otherwise, at the step 704 the over-log count is decremented. Next, the step 718 clears the upper byte and stores the over-log count. Then the error is pushed onto the stack by the step 732 if the error log count is equal to zero as determined by the step 726. Otherwise, the step is skipped and the program continues as indicated in FIG. 8.

If FIG. 8, the step 772 determines whether the present hard error was the same as the preceding soft error. If not, then the step 809 pushes the error on the "last six" stack; otherwise, the step 798 changes the last stack error to a hard error. Next, the step 847 determines whether there is a pending error. If not, the pending error is cleared and the routine is exited. If there is a pending error, then at the step 874 the last call is logged and the routine is exited.

PROGRAM TABLE I: CELOG

| STMT | SOURCE STATEMENT | | | |
|---|---|---|---|---|
| 349 | CELOG18 | DC | * | |
| 350 | | | | 1. DISABLE INTERRUPTS AND |
| 351 | | | | SAVE THE CURRENT ERROR NUMBER; |
| 353 | | GI | GRP18+INTOFF | |
| 356 | | STB | LASTCALL | |
| 358 | | | | 1. IF IN (CE MODE -AND- CE |
| 359 | | | | ERROR LOGGING HAS BEEN |
| 360 | | | | SELECTED) -OR- NOT IN CE MODE |
| 362 | | LR | CFLAGS | |
| 365 | | TP | CMODEF | |
| 368 | | JNZ | CELOG18 | |
| 371 | | TP | CRUN | |
| 374 | | JZ | CELOG2 | |
| 378 | CELOG18 | DC | * | |
| 380 | | TRA | | |
| 382 | | TP | CLOGERS | |
| 385 | | BZ | CELOG9 | |
| 387 | | | | 1. THEN |
| 388 | | | | 2. TEST FOR LOG IN PROGRESS |
| 389 | | | | AND STORE THE CURRENT |
| 390 | | | | ERROR IN THE PENDING ERROR BYTE; |
| 393 | CELOG2 | DC | * | |
| 395 | | LB | PENDERR | |
| 398 | | CI | ZERO | |
| 401 | | CLA | | |

PROGRAM TABLE I: CELOG-continued

| STMT | SOURCE STATEMENT | | | |
|---|---|---|---|---|
| 403 | | LB | LASTCALL | |
| 406 | | | | |
| 561 | | NI | CMSARA3 | |
| 564 | STB | PENDERR | | |
| 408 | | | | 2. IF THERE IS NO UNDERLYING |
| 409 | | | | LOG IN PROCESS |
| 411 | | BNZ | CELOG9 | |
| 413 | | | | 2. THEN |
| 414 | | | | 3. ENABLE INTERRUPTS AND |
| 415 | | | | SAVE THE ERROR NUMBER; |
| 418 | CELOG22 | DC | * | |
| 420 | | GI | GRP18+INTON | |
| 423 | | STR | DIAGWKO | |
| 426 | | TR | HARDERR | |
| 429 | | STR | DIAGWK2 | |
| 453 | | | | 3. IF THE ERROR CORRE- |
| 454 | | | | SPONDING TO THE |
| | | | | NUMBER IS A PAPER |
| | | | | HANDLING ERROR |
| 456 | | CI | FIRSTNPH | |
| 459 | | BNL | CELOG25 | |
| 461 | | | | 3. THEN |
| 462 | | | | 4. CALCULATE THE INDEX |
| 463 | | | | TO THE STATUS LOG |
| 464 | | | | CONTROL TABLE FOR |
| 465 | | | | THIS PAPER HAN- |
| | | | | DLING ENTRY (5 X |
| | | | | ERROR# − 5); |
| | | STR | DIAGWK2 | |
| 466 | | SHLM | 2 | |
| 472 | | AR | DIAGWK2 | |
| 475 | | SI | FIVE | |
| 478 | | J | CELOG28 | |
| 481 | | | | 3. ELSE |
| 482 | | | | 4. CALCULATE THE INDEX |
| 483 | | | | TO THE STATUS LOG |
| 484 | | | | CONTROL TABLE FOR |
| 485 | | | | THIS NON PAPER HAN- |
| | | | | DLING ERROR (2 X |
| | | | | ERR# − 2 + NCC OFF- |
| | | | | SET); |
| 488 | CELOG25 | DC | * | |
| 490 | | SHL | | |
| 492 | | AI | NPHOFSET-TWO | |
| 494 | | | | 3. ENDIF; |
| 495 | | | | 3. ADD INDEX TO TABLE START |
| 496 | | | | TO GET ENTRY ADDRESS |
| | | | | FOR THIS CALL; |
| 499 | CELOG28 | DC | * | |
| 501 | | STR | DIAGWK2 | |
| 503 | | LA | STATSLOG | |
| 512 | | AR | DIAGWK2 | |
| 515 | | STR | DIAGWK2 | |
| 517 | | | | 3. GET THE FLAG BYTE; |
| 519 | | LN | DIAGWK2 | |
| 532 | | | | 3. SAVE THE FLAG BYTE; |
| 534 | | STB | DIAGWKOH | |
| 536 | | | | 3. IF THIS ERROR IS A |
| 537 | | | | PAPER HANDLING ERROR |
| 539 | | TP | PAPRERR | |
| 542 | | BZ | CELOG4 | |
| 544 | | | | 3. THEN |
| 545 | | | | 4. POINT TO THE ERROR |
| 546 | | | | LOG BASIC ADDRESS; |
| 548 | | LR | DIAGWK2 | |
| 551 | | AI | TWO | |
| 554 | | STR | DIAGWK2 | |
| 556 | | | | 4. CONSTRUCT THE ERROR |
| | | | | LOG ADDRESS; |
| 558 | | LB | DIAGWKOH | |
| 561 | | NI | CISARA3 | |
| 564 | | TRA | | |
| 566 | | LN | DIAGWK2 | |
| 569 | | STR | DIAGWK2 | |
| 571 | | | | 4. IF THIS IS A HARD |
| 572 | | | | ERROR AND A SOFT |
| | | | | ERROR TABLE ENTRY |
| | | | | EXISTS |
| 574 | | LR | DIAGWKO | |
| 577 | | TP | HARDERR | |
| 580 | | JZ | CELOG3 | |

PROGRAM TABLE I: CELOG-continued

| STMT | SOURCE STATEMENT | | | |
|---|---|---|---|---|
| 583 | | TRA | | |
| 585 | | TP | SOFTERR | |
| 588 | | JZ | CELOG3 | |
| 590 | | | | 4. THEN |
| 591 | | | | 5. DECREMENT THE SOFT |
| 592 | | | | ERROR COUNTER; |
| 594 | | LN | DIAGWK2 | |
| 597 | | SI | HEX10 | |
| 600 | | STN | DIAGWK2 | |
| 602 | | | | 5. INCREMENT THE ERROR |
| 603 | | | | COUNT POINTER TO |
| 604 | | | | THE HARD ERROR |
| | | | | (SECOND) COUNTER; |
| 606 | | LRB | DIAGWK2 | |
| 608 | | | | 4. ENDIF; |
| 609 | | | | 4. ADD ONE TO THE ERROR |
| 610 | | | | COUNTER (HIGH NIP); |
| 613 | CELOG3 | DC | * | |
| 615 | | CLA | | |
| 617 | | LN | DIAGWK2 | |
| 620 | | AI | HEX10 | |
| 623 | | TRA | | |
| 624 | | | | 4. IF THE COUNT IS LESS |
| 625 | | | | THAN OR EQUAL TO 15 |
| 627 | | TP | BITO | |
| 630 | | BNZ | CELOG6 | |
| 632 | | | | 4. THEN |
| 633 | | | | 5. STORE THE INCRE- |
| 634 | | | | MENTED ERROR |
| | | | | COUNTER; |
| 636 | | TRA | | |
| 638 | | STN | DIAGWK2 | |
| 641 | | B | CELOG6 | |
| 644 | | | | 4. ENDIF; |
| 645 | | | | 3. ELSE |
| 646 | | | | 4. IF THIS IS A NON- |
| 647 | | | | PAPER HANDLING |
| 648 | | | | ERROR WHICH IS TO |
| 649 | | | | BE LOGGED IN THE |
| | | | | HISTORY (OVERLOG |
| | | | | PROTECTED) STACK |
| 652 | CELOG4 | DC | * | |
| 671 | | LR | DIAGWKO | |
| 674 | | TRA | | |
| 676 | | TP | HISTERR | |
| 678 | | SRG | GRP20 | |
| 684 | | BZ | CELOG6 | |
| 686 | | | | 4. THEN |
| 687 | | | | 5. IF THIS ERROR IS |
| 688 | | | | THE SAME AS THE |
| 689 | | | | LAST ENTRY IN THE |
| | | | | HISTORY LOG |
| 691 | | TRA | | |
| 693 | | CB | EPOLOGIL | |
| 696 | | CLA | | |
| 698 | | JNE | CELOG5 | |
| 700 | | | | 5. THEN |
| 701 | | | | 6. LOAD AND DECRE- |
| 702 | | | | MENT THE OVER- |
| | | | | LOG COUNTER; |
| 704 | | LB | OVLOGCNT | |
| 707 | | SI | | |
| 708 | | | | 5. ELSE |
| 709 | | | | 6. RETAIN A ZERO |
| 710 | | | | COUNT (FROM |
| | | | | THE PREVIOUS |
| | | | | CLEAR; |
| 711 | | | | 5. ENDIF; |
| 712 | | | | 5. CLEAR THE HIGH NIP |
| 713 | | | | AND STORE THE |
| | | | | OVERLOG COUNT; |
| 716 | CELOG5 | DC | * | |
| 718 | | NI | HEXOF | |
| 721 | | STB | OVLOGCNT | |
| 723 | | | | 5. IF THE CURRENT |
| 724 | | | | OVERLOG COUNT IS |
| | | | | ZERO |
| 726 | | JNZ | CELOG6 | |
| 728 | | | | 5. THEN |
| 729 | | | | 6. PUSH THIS ERROR |
| 730 | | | | INTO THE HIS- |

PROGRAM TABLE I: CELOG-continued

```
STMT  SOURCE STATEMENT
                                          TORY STACK;
732  CELOGBP  LR    EPOLOG3
735           TRA
737           LB    EPOLOG2H
740           STR   EPOLOG3
743           LR    EPOLOG2
746           TRA
748           LB    EPOLOG1H
751           STR   EPOLOG2
754           LR    EPOLOG1
757           TRA
759           LB    DIAGWKOL
762           STR   EPOLOG1
764                                       5. ENDIF;
765                                       4. ENDIF;
766                                       3. ENDIF;
767                                       3. IF THE CURRENT ERROR
768                                       IS A HARD VERSION OF
769                                       THE SOFT ERROR
                                          IMMEDIATELY PRECEDING
                                          IT
772  CELOG6   DC    *
773           SRG   GRP20
779           LR    LASTERR1
782           TS    HARDERR
785           JNZ   CELOG65
788           CB    DIAGWKOL
791           JNE   CELOG65
793                                       3. THEN
794                                       4. CHANGE THE LAST
795                                       LOGGED ERROR (IN
796                                       THE STACK OF SIX)
                                          TO A HARD ERROR;
798           STR   LASTERR1
801           J     CELOG7
804                                       3. ELSE
805                                       4. PUSH THE ERROR INTO
806                                       THE LAST SIX
                                          ERRORS STACK;
809  CELOG65  DC    *
811           LR    LASTERR3
814           TRA
816           LB    LASTER2H
819           STR   LASTERR3
822           LR    LASTERR2
825           TRA
827           LB    LASTER1H
830           STR   LASTERR2
833           LR    LASTERR1
836           TRA
838           LB    DIAGWKOL
841           STR   LASTERR1
843                                       3. ENDIF;
844                                       3. IF THERE IS A PENDING
                                          ERROR
847  CELOG7   DC    *
849           GI    GRP18+INTOFF
852           CLA
854           LR    DIAGWKO
857           CB    PENDERR
860           JE    CELOG8
862                                       3. THEN
863                                       4. GO TO (CELOG22) LOG
864                                       THE LAST EMITTER
                                          CALL BEFORE
                                          RETURNING;
866           B     CELOG22
869                                       3. ELSE
870                                       4. CLEAR THE PENDING
871                                       ERROR/LOG IN
                                          PROGRESS INDICA-
                                          TION;
874  CELOG8   DC    *
876           CLA
878           STB   PENDERR
880                                       3. ENDIF;
881                                       2. ENDIF;
882                                       1. ENDIF;
883                                       1. GET INTO REGISTER GROUP
884                                       3 AND ENABLE INTERRUPTS;
887  CELOG9   DC    *
```

PROGRAM TABLE I: CELOG-continued

| STMT | SOURCE STATEMENT | | | |
|---|---|---|---|---|
| 889 | | GI | GRP3+INTON | |
| 891 | | | | 1. IF CALLED BY AN EMITTER MODULE |
| 892 | | TPB | EMITSTAT,EMITPROC | |
| 900 | | JZ | CELOG95 | |
| 902 | | | | 1. THEN |
| 903 | | | | 2. RETURN ON REGISTER 2; |
| 905 | | RTN | R2 | |
| 908 | | | | 1. ELSE |
| 909 | | | | 2. RETURN ON REGISTER 0 |
| 912 | CELOG95 | DC | * | |
| 914 | | RTN | R0 | |
| 917 | | | | 1. ENDIF; |
| 937 | | | | END SEGMENT (CELOG); |

In the second routine, the CEXCHK program updates the error criterion exception counters. After every 256 copy attempts, an update of the error log is requested. When a standby state is subsequently entered, this module begins the update procedure. Each zero crossing of the power supply initiates a loop in which a single error log is updated until all the paper handling errors having a criterion have been processed.

In an update, the high byte of the copy attempt counter is compared with the update limit which is the number of 256 copy attempts between updates. The counter is divided by the limit and a zero remainder indicates the programmed number of blocks have elapsed and an update is indicated.

If an update is indicated, the criterion is fetched, normally from the status log table but it is possible to substitute an alternate criterion which is field programmable into the memory. The presence of the alternate criterion bit in the counter byte causes the alternate criterion to be loaded.

The number of errors since the last update is compared to the criterion. If the error count equals or exceeds the criterion, the exception count is incremented by one (up to a limit of fifteen). Otherwise, the exception counter is cleared. In both cases, the current error counter is cleared. If a zero criterion is encountered, then both the exception and error counts are cleared to zero. If the error being updated is of the dual type, both hard and soft, the hard error log is updated immediately after the soft error log. When the second update is completed or if there is only one error type, the module is exited.

When all error logs have been updated, the last exception counter is updated and the update request flag, set by the copy attempts counter, is reset. This routine is then bypassed for approximately 256 copy attempts. A copy attempt corresponds to the command described above.

The exceptions updating is inhibited when the machine is in the service mode and the service mode is inhibited while exceptions updating is active.

The memory counters used to log the errors and count exceptions are organized as follows. The low hexadecimal digit of the first byte is the exception counter for the first type of error and the high digit are the occurrence counters for the first type of error. If bit three is set, then an alternate criterion has been established for this error. The second byte is organized the same as the first byte for a second or hard type error.

Byte number three is the alternate criterion for the first error type.

Figures 3, 5:
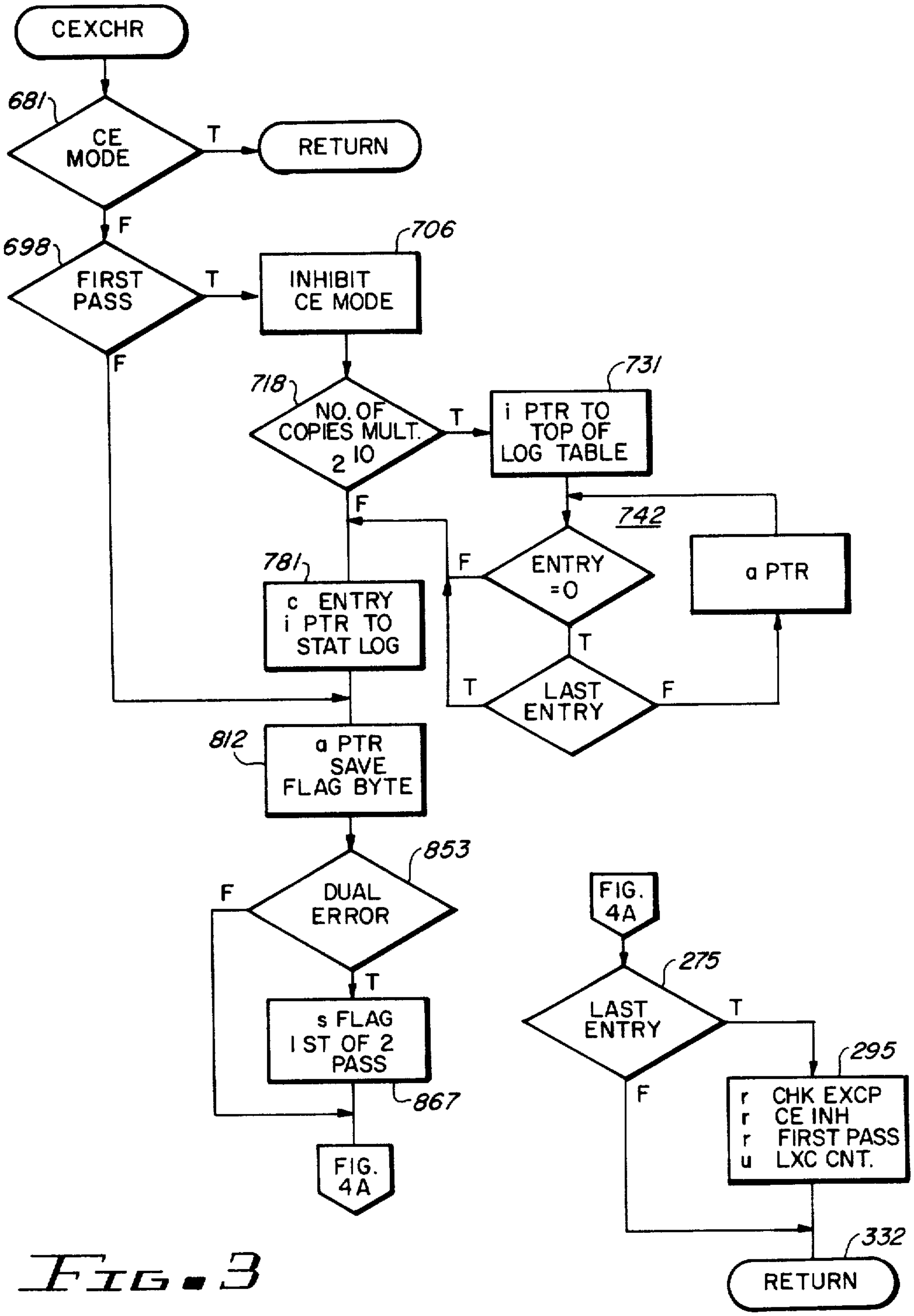
FIGS. 3, 4 and 5 are flowcharts showing the details of a program for implementing the invention.
Figure 4:
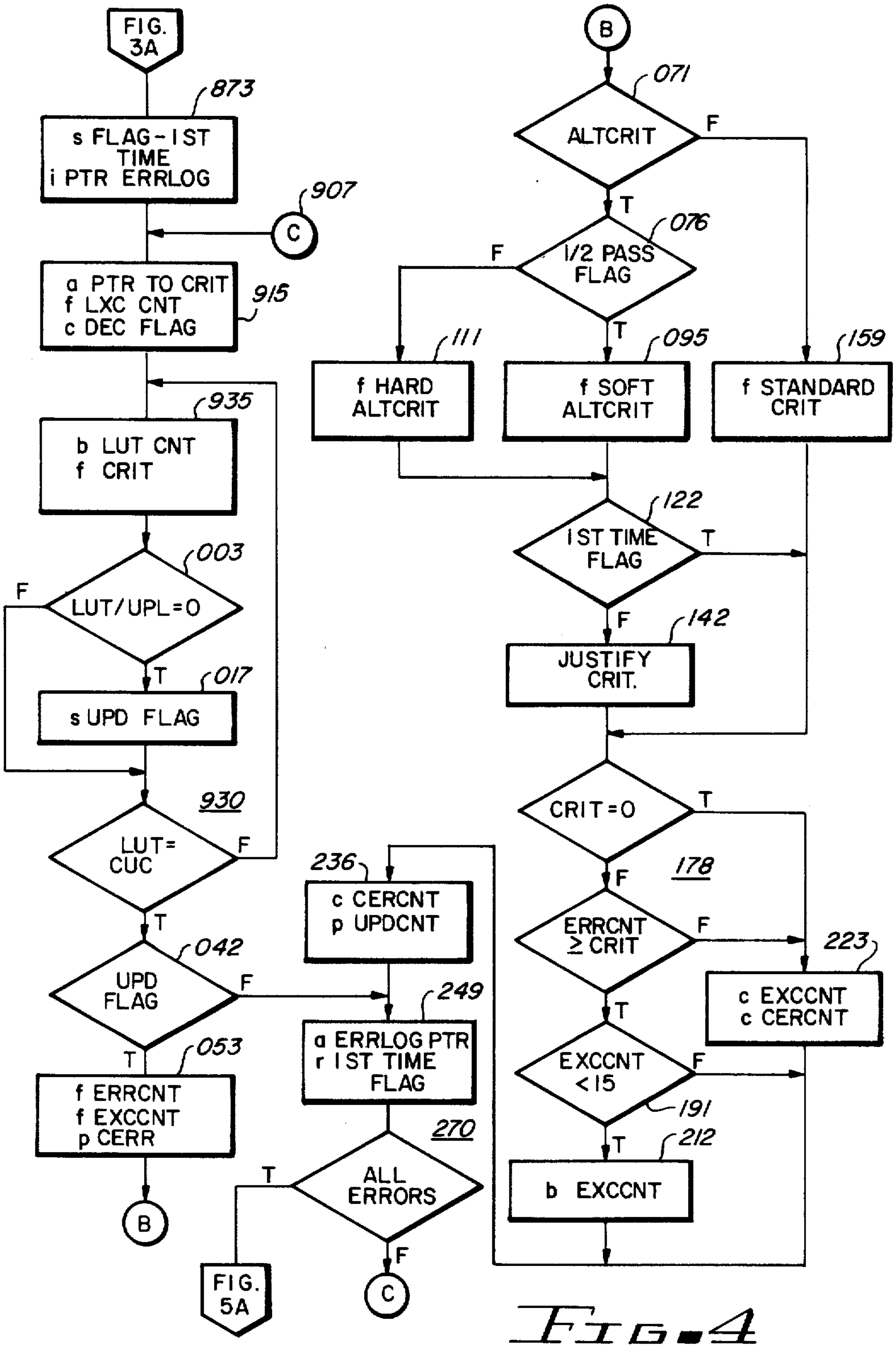

The routine is shown in FIGS. 3, 4 and 5 and described in detail in the following program Table II. In FIG. 3, at the step 681, the routine is exited if in the service mode. Next, the step 698 determines whether the routine is in the first pass and, if so, inhibits the service mode by the step 706.

If the copies are a multiple of $2^{10}$, the pointer is initialized to the top of the log table by the step 731 and the step 742 causes the pointer to be advanced until a non-zero entry is found or until the last entry has been found. Then the step 781 clears the entry to zero and initializes the pointer to the status log. Next, the step 812 is performed, the previous steps being skipped if not in the first pass of the program. The step 812 advances the pointer and saves the flag byte. Next, the step 853 determines whether it is a dual type error. If so, it sets a flag indicating the first of two passes by the step 867 and otherwise continues on FIG. 4 as indicated.

In FIG. 4, the step 873 sets a first time flag and initializes the pointer to the error log. Next, at the step 915 the pointer is advanced to the criteria, the last exception count is fetched from memory, and the decision flag is cleared. In the step 935, the last update time count is incremented by one and the criterion is fetched. In the step 003, the last update is divided by the update count of the last update and, if the remainder is zero, then the update flag is set by the step 017. Otherwise, the program continues at the step 930 where a comparison is made to determine whether the last update time is equal to the current update count. If not, the program returns to the step 935 described above. If so, the update flag is checked by the step 042. If the update flag is set, then at the step 053, the error count and exception count are fetched from memory and the current error is stored. If the update flag was not set, the program continues at the step 249 which will be described below.

Next, at the step 071, it is determined whether an alternate criteria is to be used. If so, the first out of two pass flags is checked by the step 076 to determine whether the hard alternate criteria is to be fetched by the step 111. If the flag is set, the soft alternate criteria is fetched by the step 095. If the flag is reset, the hard alternate criteria is fetched by the step 111. Next, the step 122 determines whether the first time flag is set and if not, justifies the criteria by the step 142. If the alternate criteria is not to be used, then at the step 159, the standard criteria is fetched and the program continues at the decision step 178 which determines whether the criteria is not zero and the error count is not less than the criterion. If so, the exception count is checked to determine whether it is less than fifteen by the step 191. If so, then the exception count is incremented by the step 212.

If the criterion is zero or if the error count is less than the criteria, the exception count and the current error count are reset by the step 223.

Next, the step 236 is performed which clears the current error count and stores the updated count. Then the step 249 advances the error log pointer and resets the first time flag. Next, the step 270 determines whether all errors have been handled and if not, returns to the step 915 and the process described above is repeated. Otherwise, the program continues as indicated at FIG. 5.

In FIG. 5, the step 275 tests whether it is the last entry in the table. If so, then at the step 295 the check exception, the maintenance inhibit and the first pass flags are reset. Then the last exception count is updated and the program is exited at the step 332, the above steps being skipped if the last entry has not been processed as determined by the step 275.

PROGRAM TABLE II: CEXCHK

| STMT | SOURCE STATEMENT | | | |
|---|---|---|---|---|
| 661 | CEXCHK | DC | * | |
| 679 | | | | 2. IF NOT IN CE MODE (RUN |
| | | | | OR STANDBY) |
| 681 | | TRA | | |
| 683 | | TP | CMODEF | |
| 686 | | BNZ | CEXCHKX | |
| 689 | | TP | CRUN | |
| 692 | | BNZ | CEXCHKX | |
| 694 | | | | 2. THEN |
| 695 | | | | 3. IF THIS IS THE FIRST |
| 696 | | | | PASS THROUGH EXCEP- |
| | | | | TION CHECKING |
| 698 | | TS | CFIRCOM | |
| 701 | | BNZ | CEXCHK10 | |
| 703 | | | | 3. THEN |
| 704 | | | | 4. INHIBIT CE MODE; |
| 706 | | STR | CFLAGS | 29/34 |
| 708 | | TSB | CFLAG3,CEINHBIT | 29/34 |
| 717 | | | | 4. IF THIS UPDATE IS |
| 718 | | | | OCCURRING ON AN |
| | | | | INTEGER MULTIPLE |
| | | | | OF 1024 COPIES |
| 720 | | LB | EXCYCLEH | |
| 723 | | NI | HEX03 | |
| 726 | | BNZ | CEXCHK7 | |
| 728 | | | | 4. THEN |
| 729 | | | | 5. LOAD THE ADDRESS |
| 730 | | | | OF THE END OF |
| | | | | THE NPH SCAN |
| | | | | TABLE; |
| 731 | | LA | NPHLGTAB+5 | |
| 740 | | STR | R10WK | |
| 742 | | | | 5. REPEAT |
| 743 | | | | 6. ACCESS (IN |
| 744 | | | | DECENDING |
| | | | | ORDER) ENTRIES |
| | | | | IN THE NPH LOG; |
| 747 | CEXCHK5 | DC | * | |
| 749 | | LI | HEX02 | |
| 752 | | TRA | | |
| 754 | | LN | R10WK | |
| 757 | | STR | DIAGWK5 | |
| 760 | | LN | DIAGWK5 | |
| 762 | | | | 5. UNTIL THE ENTRY |
| 763 | | | | IS NON ZERO OR |
| 764 | | | | THE ENTIRE LOG |
| | | | | HAS BEEN SCANNED |
| 766 | | CI | ZERO | |
| 769 | | JNE | CEXCHK6 | |
| 772 | | LRD | R10WK | |
| 775 | | CIL | NPHLGTAB-1 | |
| 778 | | JNE | CEXCHK5 | |
| 780 | | | | 5. ENDREPEAT; |
| 781 | | | | 5. ZERO THE ADDRESSED |
| | | | | LOG ENTRY; |
| 784 | CEXCHK6 | DC | * | |
| 786 | | CLA | | |
| 788 | | STN | DIAGWK5 | |
| 790 | | | | 4. ENDIF; |
| 791 | | | | 4. INITIALIZE THE STATUS |
| 792 | | | | LOG TABLE POINTER; |
| 795 | CEXCHK7 | DC | * | |
| 796 | | LA | STATSLOG-FIVE | |
| 805 | | STR | R10WK | |
| 807 | | | | 3. ENDIF; |
| 808 | | | | 3. ADVANCE THE STATUS LOG |
| 809 | | | | TABLE POINTER TO THE |
| | | | | NEXT ENTRY; |
| 812 | CEXCHK10 | DC | * | |
| 814 | | LR | R10WK | |

PROGRAM TABLE II: CEXCHK-continued

| STMT | SOURCE STATEMENT | | | |
|---|---|---|---|---|
| 817 | | AI | FIVE | |
| 820 | | STR | R10WK | |
| 822 | | | | 3. FETCH AND STORE THE |
| 823 | | | | FLAG BYTE OF THE |
| | | | | CURRENT TABLE ENTRY; |
| 825 | | STR | DIAGWK4 | |
| 828 | | LN | DIAGWK4 | |
| 831 | | STR | DIAGWK1 | |
| 849 | | | | 3. IF THERE ARE TWO |
| 850 | | | | ERRORS (HARD AND |
| 851 | | | | SOFT) ASSOCIATED |
| | | | | WITH THIS TABLE |
| | | | | ENTRY |
| 853 | | OI | P0(HARDERR,SOFTERR) | |
| 858 | | LB | CFLAG3 | |
| 861 | | BNL | CEXCHK15 | |
| 863 | | | | 3. THEN |
| 864 | | | | 4. FLAG A FIRST PASS |
| 865 | | | | OF TWO CONDITION; |
| 867 | | TS | CEX10F2 | |
| 869 | | | | 3. ENDIF; |
| 870 | | | | 3. SET A FIRST PASS; |
| 873 | CEXCHK15 | DC | * | |
| 875 | | TS | CEXPASS1 | |
| 878 | | STB | CFLAG3 | |
| 880 | | | | 3. FETCH THE BASE ADDRESS |
| 881 | | | | OF THE FIRST ERROR |
| | | | | LOG; |
| 883 | | LR | DIAGWK4 | |
| 886 | | AI | TWO | |
| 889 | | STR | DIAGWK4 | |
| 892 | | LN | DIAGWK4 | |
| 894 | | | | 3. CONSTRUCT THE COMPLETE |
| 895 | | | | FIRST ERROR LOG |
| | | | | ADDRESS; |
| 897 | | TRA | | |
| 899 | | LB | DIAGEK1L | |
| 902 | | NI | CMSARA3 | |
| 905 | | TRA | | |
| 907 | | STR | DIAGWK3 | |
| 909 | | | | 3. REPEAT |
| 910 | | | | 4. POINT TO THE APPRO- |
| 911 | | | | PRIATE CRITERION |
| 912 | | | | ENTRY IN THE STA- |
| | | | | TUS LOG TABLE; |
| 915 | CEXCHK20 | DC | * | |
| 917 | | LRB | DIAGWK4 | |
| 919 | | | | 4. LOAD THE LAST |
| 920 | | | | EXCEPTIONS CHECK |
| 921 | | | | COUNT AND CLEAR |
| | | | | THE DECISION FLAG; |
| 923 | | CLA | | |
| 925 | | LB | LASTEXCY | |
| 928 | | STR | DIAGWK5 | |
| 930 | | | | 4. REPEAT |
| 931 | | | | 5. BUMP THE LAST |
| 932 | | | | UPDATE TEMPO- |
| | | | | RARY COUNTER; |
| 935 | CEXCHK25 | DC | * | |
| 937 | | LRB | DIAGWK5 | |
| 939 | | | | 5. STORE THE COUNT |
| 940 | | | | IN THE DIVIDEND |
| | | | | REGISTER; |
| 942 | | TRA | | |
| 944 | | LI | ZERO | |
| 947 | | TRA | | |
| 948 | | SRG | GRP19 | |
| 954 | | STR | DIVIDEND | |
| 956 | | | | 5. FETCH THE CRITERION |
| | | | | BYTE; |
| 957 | | SRG | GRP18 | |
| 963 | | LN | DIAGWK4 | |
| 965 | | | | 5. RETAIN THE CRITERION |
| 966 | | | | UPDATE LIMIT ONLY; |
| 968 | | NI | HEX0F | |
| 970 | | | | 5. CALL (DIVIDE) DIVIDE |
| 971 | | | | THE COPY COUNT |
| 972 | | | | (HIGH BYTE) BY |
| | | | | THE UPDATE LIMIT; |
| 973 | | SRG | GRP3 | |
| 979 | | BAL | R0,DIVIDE | |

PROGRAM TABLE II: CEXCHK-continued

| STMT | SOURCE STATEMENT | | | |
|---|---|---|---|---|
| 981 | | | | 5. RESET THE PROCESS |
| | | | | MONITOR |
| 983 | | GI | GRP0+INTOFF | |
| 986 | | LB | INTOUTM | |
| 989 | | TS | PROCCLR | |
| 992 | | STB | INTOUT | |
| 995 | | TR | PROCCLR | |
| 998 | | STB | INOUT | |
| 000 | | | | 5. IF THE REMAINDER |
| 001 | | | | AFTER DIVISION |
| | | | | IS ZERO |
| 003 | | GI | GRP18+INTON | |
| 006 | | LB | REMAINDL | |
| 009 | | CI | ZERO | |
| 012 | | JNE | CEXCHK30 | |
| 014 | | | | 5. THEN |
| 015 | | | | 6. FLAG A DECISION |
| | | | | TO UPDATE; |
| 017 | | LI | P(BIT7) | 19/3 |
| 021 | | STB | DIAGWK5H | |
| 023 | | | | 5. ENDIF; |
| 024 | | | | 4. UNTIL THE LAST UP- |
| 025 | | | | DATE COUNTER EQUALS |
| 026 | | | | THE CURRENT UP- |
| | | | | DATE COUNTER |
| 029 | CEXCHK30 | DC | * | |
| 031 | | LR | DIAGWK5 | |
| 034 | | CB | EXCYCLEH | |
| 037 | | BNE | CEXCHK25 | |
| 039 | | | | 4. ENDREPEAT; |
| 040 | | | | 4. IF AN UPDATE IS |
| | | | | INDICATED |
| 042 | | TRA | | |
| 044 | | TP | BIT7 | |
| 047 | | BZ | CEXCHK65 | |
| 049 | | | | 4. THEN |
| 050 | | | | 5. FETCH THE ERROR |
| 051 | | | | AND EXCEPTION |
| | | | | COUNTERS; |
| 053 | | LN | DIAGWK3 | |
| 055 | | | | 5. STORE THE CURRENT |
| 056 | | | | ERROR COUNTER |
| | | | | ONLY (HIGH NIP); |
| 058 | | SHR | | 19/3 |
| 060 | | NI | (HEXF0+ALTCRITM) | 19/3 |
| 063 | | TR | ALTCRIT-1 | |
| 066 | | STR | DIAGWK1 | |
| 068 | | | | 5. IF AN ALTERNATE |
| 069 | | | | CRITERION IS |
| | | | | BEING USED |
| 071 | | BZ | CEXCHK45 | |
| 073 | | | | 5. THEN |
| 074 | | | | 6. IF THIS IS A |
| 075 | | | | FIRST PASS OF |
| | | | | TWO THROUGH |
| | | | | THE UPDATE |
| | | | | LOOP |
| 076 | | TPB | CFLAG3,CEX10F2 | |
| 084 | | LR | DIAGWK3 | |
| 087 | | JZ | CEXCHK35 | |
| 089 | | | | 6. THEN |
| 090 | | | | 7. POINT TO THE |
| 091 | | | | ALTERNATE |
| 092 | | | | CRITERION |
| 093 | | | | BYTE (TWO |
| | | | | ABOVE THE |
| | | | | CURRENT |
| | | | | TABLE |
| | | | | POINTER); |
| 095 | | AI | TWO | |
| 098 | | STR | DIAGWK2 | |
| 101 | | J | CEXCHK40 | |
| 104 | | | | 6. ELSE |
| 105 | | | | 7. POINT TO THE |
| 106 | | | | ALTERNATE |
| 107 | | | | CRITERION BYTE |
| 108 | | | | (ONE ABOVE |
| | | | | THE CURRENT |
| | | | | TABLE POINT- |
| | | | | ER); |
| 111 | CEXCHK35 | DC | * | |

PROGRAM TABLE II: CEXCHK-continued

| STMT | SOURCE STATEMENT | | | |
|---|---|---|---|---|
| 113 | | AI | | |
| 115 | | STR | DIAGWK2 | |
| 117 | | | | 6. ENDIF; |
| 118 | | | | 6. TEST FOR SECOND |
| 119 | | | | PASS THROUGH |
| | | | | THE UPDATE |
| | | | | LOOP; |
| 122 | CEXCHK40 | DC | * | |
| 124 | | LB | CFLAG3 | |
| 127 | | TP | CEXPASS1 | |
| 129 | | | | 6. LOAD THE ALTERNATE |
| 130 | | | | CRITERION BYTE; |
| 132 | | LN | DIAGWK2 | |
| 134 | | | | 6. IF THIS IS THE |
| 135 | | | | SECOND PASS |
| | | | | THROUGH THE |
| | | | | UPDATE LOOP |
| 137 | | JNZ | CEXCHK50 | |
| 139 | | | | 6. THEN |
| 140 | | | | 7. LEFT JUSTIFY |
| 141 | | | | THE FIRST PASS |
| | | | | ALTERNATE |
| | | | | CRITERION; |
| 142 | | SHLM | 4 | |
| 150 | | J | CEXCHK50 | |
| 153 | | | | 6. ENDIF; |
| 154 | | | | 5. ELSE |
| 155 | | | | 6. LOAD THE STAN- |
| 156 | | | | DARD CRITE- |
| | | | | RION FOR THIS |
| | | | | ERROR; |
| 159 | CEXCHK45 | DC | * | |
| 161 | | LN | DIAGWK4 | |
| 163 | | | | 5. ENDIF; |
| 164 | | | | 5. RETAIN THE CRITE- |
| 165 | | | | RION COUNT ONLY |
| | | | | (HIGH NIP); |
| 168 | CEXCHK50 | DC | * | |
| 170 | | SHR | | |
| 172 | | NI | HEXF0/2 | |
| 174 | | | | 5. IF THE CRITERION |
| 175 | | | | IS NOT ZERO AND |
| 176 | | | | THE ERROR COUNT |
| | | | | EQUALS OR EXCEEDS |
| | | | | THE CRITERION |
| 178 | | JZ | CEXCHK55 | |
| 181 | | CB | DIAGWK1L | |
| 184 | | BH | CEXCHK55 | |
| 186 | | | | 5. THEN |
| 187 | | | | 6. IF THE EXCEP- |
| 188 | | | | TION COUNTER |
| | | | | IS NOT FULL |
| | | | | (LESS THAN 15 ) |
| 191 | CEXCHK52 | DC | * | |
| 193 | | LN | DIAGWK3 | |
| 196 | | NI | HEX0F-ALTCRITM | |
| 199 | | LN | DIAGWK3 | |
| 201 | | JL | CEXCHK60 | |
| 208 | | | | 6. THEN |
| 209 | | | | 7. INCREMENT THE |
| 210 | | | | EXCEPTION |
| | | | | COUNTER; |
| 212 | | AI | | |
| 214 | | J | CEXCHK60 | |
| 217 | | | | 6. ENDIF; |
| 218 | | | | 5. ELSE |
| 219 | | | | 6. CLEAR THE |
| 220 | | | | CURRENT ERROR |
| | | | | AND EXCEPTION |
| | | | | COUNTERS; |
| 223 | CEXCHK55 | DC | * | |
| 225 | | LN | DIAGWK3 | |
| 228 | | NI | P(ALTCRIT) | |
| 231 | | | | 5. ENDIF; |
| 232 | | | | 5. CLEAR THE CURRENT |
| 233 | | | | ERRORS COUNTER |
| | | | | (HIGH NIP); |
| 236 | CEXCHK60 | DC | * | |
| 238 | | NI | HEX0F | |
| 240 | | | | 5. STORE THE UP- |
| | | | | DATED COUNTER; |

PROGRAM TABLE II: CEXCHK-continued

| STMT | SOURCE STATEMENT | | | |
|---|---|---|---|---|
| 242 | | STN | DIAGWK3 | |
| 244 | | | | 4. ENDIF; |
| 245 | | | | 4. ADVANCE THE ERROR |
| 246 | | | | LOG COUNTER TO THE NEXT ENTRY; |
| 249 | CEXCHK65 | DC | * | |
| 251 | | LRB | DIAGWK3 | |
| 253 | | | | 4. RESET THE PASS 1 FLAG; |
| 255 | | LB | CFLAG3 | |
| 258 | | TR | CEXPASS1 | |
| 260 | | | | 3. UNTIL ALL EROORS HAVE BEEN UPDATED |
| 262 | | TR | CEX1OF2 | |
| 265 | | STB | CFLAG3 | |
| 268 | | BNZ | CEXCHK20 | |
| 270 | | | | 3. ENDREPEAT; |
| 271 | | | | 3. IF THE LAST TABLE ENTRY |
| 272 | | | | (HAVING A CRITERION) HAS BEEN PROCESSED |
| 275 | CEXCHKD1 | DC | * | |
| 276 | | LA | STARTNPH-FIVE | |
| 285 | | SR | R10WK | |
| 288 | | JNE | CEXCHKX | |
| 290 | | | | 3. THEN |
| 291 | | | | 4. RESET THE CHECK |
| 292 | | | | EXCEPTIONS,INHIBIT |
| 293 | | | | CE MODE,AND FIRST ENTRY COMPLETE FLAGS; |
| 295 | | LR | CFLAGS | |
| 298 | | TR | CFIRCOM | |
| 301 | | TRA | | |
| 303 | | TR | CKEXCP | |
| 306 | | TRA | | |
| 308 | | STR | CFLAGS | |
| 310 | | TRB | CFLAG3,CEINHBIT | |
| 319 | | | | 4. UPDATE THE LAST |
| 320 | | | | EXCEPTIONS CHECK COUNTER; |
| 322 | | LB | EXCYCLEH | |
| 325 | | STB | LASTEXCY | |
| 327 | | | | 3. ENDIF; |
| 328 | | | | 2. ENDIF; |
| 329 | | | | 1. ENDIF; |
| 332 | CEXCHKX | DC | * | |
| 333 | | | | END SEGMENT (CEXCHK); |

APPENDIX A

| INSTRUCTION MNEMONIC | HEX VALUE | NAME | DESCRIPTION |
|---|---|---|---|
| AB | A4 | Add Byte | Adds addressed operand to ACC |
| AI | AC | Add Immed. | Adds address field to ACC |
| AR | DN | Add Reg. | Adds N-th register to ACC |
| A1 | 2E | Add One | Adds 1 to ACC |
| B | 24,28,2C | Branch | Branch to LSB (+256, −256, ±0) |
| BAL | 30–33 | Branch And Link | Used to call subroutines |
| BE | 35,39,3D | Branch Equal | Branches if EQ set |
| BH | 36,3A,3E | Branch High | Branch if EQ and LO are reset |
| BNE | 34,38,3C | Branch Not Equal | Branch if EQ reset |
| BNL | 37,3B,3F | Branch Not Low | Branch if LO reset |
| CB | A0 | Compare Byte | Addressed byte compared to ACC |
| CI | A8 | Compare Immed. | Address field compared to ACC |
| CLA | 25 | Clear Acc. | ACC reset to all zeroes |
| GI | A9 | Group Immed. | Selects one of 16 register groups |
| IC | 2D | Input Carry | Generate carry into ALU |
| IN | 26 | Input | Read into ACC from addressed device |
| J | 0N,1N | Jump | Jump forward or back using N-th register |
| JE | 4N,5N | Jump Equal | Jump if EQ set |
| JNE | 6N,7N | Jump Not Equal | Jump if EQ reset |
| LB | A6 | Load Byte | Load addressed byte into ACC |
| LDR | FN | Load/Decr.Reg. | Load reg. N and decrement (N=0-3.8-B) |

APPENDIX A-continued

| INSTRUCTION MNEMONIC | HEX VALUE | NAME | DESCRIPTION |
|---|---|---|---|
| LI | AE | Load Immed. | Load address field into ACC |
| LN | 98-9F | Load Indirect | Load byte addressed by reg. N into ACC |
| LR | EN | Load Register | Load register N into ACC |
| LRB | FN | Load Reg./Bump | Load reg. N and increment (N=4-7,C-F) |
| NB | A3 | And Byte | AND addressed byte into ACC |
| NI | AB | And Immed. | AND address field into ACC |
| OB | A7 | Or Byte | OR addressed byte into ACC |
| OI | AF | Or Immed. | OR address field into ACC |
| OUT | 27 | Output | Write ACC to addressed device |
| RTN | 20–23 | Return | Used to return to calling program (See BAL.) |
| SB | A2 | Subtract Byte | Subtract addressed byte from ACC |
| SHL | 2B | Shift Left | Shift ACC one bit left |
| SHR | 2F | Shift Right | Shift ACC one bit right |
| SI | AA | Subtract Immed. | Subtract address field from ACC |
| SR | CN | Subtract Reg. | Subtract reg. N from ACC |
| STB | A1 | Store Byte | Store ACC at address |
| STN | B8-BF | Store Indirect | Load ACC at address in reg. |
| STR | 8N | Store Reg. | Store reg. N at address |
| S1 | 2A | Subtract One | Subtract 1 from ACC |
| TP | 9N | Test/Preserve | Test N-th bit in ACC (N=0–7) |
| TR | BN | Test/Reset | Test and reset N-th bit in ACC |
| TRA | 29 | Transpose | Interchange high and low ACC bytes |
| XB | A5 | XOR Byte | Exclusive OR addressed byte into ACC |
| XI | AD | XOR Immed. | Exclusive OR address field into ACC |

Notes:
ACC (Accumulator) is 16-bit output register from arithmetic-logic unit
- all single byte operations are into low byte
- all byte and immediate operations are single byte operations
- register operations are 16-bit (two-byte)
EQ (equal) is a flag which is set:
if ACC=0 after register AND or XOR operations;
if ACC (low byte)=0 after single byte operation;
if a tested bit is 0;
if bits set by OR were all 0's;
if input carry = 0;
if compare operands are equal;
if bit shifted out of ACC = 0;
if 8th bit of data during IN or OUT = 0.
LO (low) is a flag which is set: (always reset by IN, OUT, IC)
if ACC bit 16=1 after register operation;
if ACC bit 8=1 after single byte operations;
if logic operation produces all ones;
if all bits other than tested bit = 0;
if ACC=0 after shift operation;
if compare operand is greater than ACC low byte.

| MACRO MNEMONIC | NAME | DESCRIPTION |
|---|---|---|
| BC | Branch on Carry | Branches if carry is set |
| BL | Branch on Low | Branches if LO is set |
| BNC | Branch Not Carry | Branches if carry is reset |
| BNZ | Branch Not Zero | Branches if previous result was not zero |
| BR | Branch via Register | Same as RTN instruction |
| BU | Branch Unconditionally | Same as BAL instruction |
| CIL | Compare Immed. Low | Uses low byte of indicated constant in CI address field |
| DC | Define Constant | Reserves space for constant |
| JC | Jump on Carry | See BC |
| JL | Jump on Low | See BL |
| JNC | Jump on No Carry | See BNC |
| LA | Load Address | Generates sequence LIH, TRA, LIL |
| LRD | Load Reg. and Decrement | Same as LDR instruction |
| LIH | Load Immed. High | Uses high byte of constant in LI address field |
| LIL | Load Immed. Low | Uses low byte of constant in LI address field |

-continued

| MACRO MNEMONIC | NAME | DESCRIPTION |
|---|---|---|
| NOP | No Operation | Dummy instruction - skipped |
| RAL | Rotate and Add Left | Generates sequence SHL, IC, A1 |
| SHLM | Shift Left Multiple | Shifts specified number of times to left |
| SHRM | Shift Right Multiple | Shifts specified number of times to right |
| SRG | Set Register Group | Same as GI |
| TPB | Test & Preserve Bit | Generates sequence LB, TP |
| TRB | Test & Reset Bit | Generates sequence LB, TR, STB |
| TRMB | Test & Reset Multiple Bits | Same as TRB but specifies multiple bits |
| TS | Test and Set | Same as OI instruction |
| TSB | Test & Set Byte | Same as TS but byte is specified in addition to bit |
| TSMB | Test & Set Multiple Bytes | Same as TS but specifies multiple Bits |

NOTES:
(Label) DC * causes the present location (*) to be associated with the label.
L and H, in general, are suffixes indicating low or high byte when 16 bit operands are addressed.

APPENDIX B

Abbreviations used:

Operational (lower case)

| | | |
|---|---|---|
| a | - | advance |
| b | - | increment (bump) |
| c | - | clear, zero |
| d | - | decrement (−1) |
| f | - | fetch, get |
| g | - | gate |
| i | - | initialize |
| p | - | store, put |
| r | - | reset |
| s | - | set |
| u | - | update |

Identifiers (upper case)

| | | |
|---|---|---|
| CER | - | current error |
| CUP | - | current update |
| CT | - | count |
| CTR | - | counter |
| DIAGWD0 | - | low byte error number |
| DIAGWK1 | - | used initially as flag byte from status log control table and subsequently as the current error counter |
| DIAGWK2 | - | status log table address |
| DIAGWK3 | - | counter address |
| DIAGWK4 | - | memory byte: current line of status log control table |
| DIAGWK5 | - | two-byte storage used as last exceptions update count (low byte) and update decision flag (high byte) |
| ENB | - | enable |
| ERR | - | error |
| EXC | - | exception |
| EXCYCEH | - | high byte of two-byte cycle counter |
| FL | - | flag |
| HERR | - | hard error |
| INH | - | inhibit |
| LUT | - | last update temporary |
| LXCK | - | last exception check |
| NPH(ERR) | - | nonpaper handling (error) |
| PEB | - | pending error byte |
| PH(ERR) | - | paper handling (error) |
| R10WK | - | address of first entry in status log control table corresponding to present error |
| SERR | - | soft error |
| UPD | - | update |
| UPL | - | update limit |
| ½PASS | - | first of two passes |

Various modifications to the systems and procedures described and illustrated to explain the concepts and modes of practicing the invention can be made by those of ordinary skill in the art while remaining within the principles and scope of the invention as expressed in the appended claims.

What is claimed is:

1. In a control system having means for supplying command signals to initiate system functions and means for producing error signals indicating system malfunctions, the combination comprising:

means responsive to said command signals for producing a control signal after a certain number of command signals have been supplied;

error counter means responsive to said error signals for storing a count value representing the number of error signals which have occurred;

sensing means responsive to said error counter means for producing a value signal when said error counter means is storing a value not less than a predetermined value; and exception counter means responsive to the value signal and said control signal for incrementing said exception counter means by said control signal if said value signal is present and resetting said exception counter means by said control signal if said value signal is not present.

2. The invention as claimed in claim 1 wherein said means for producing said control signal includes:

limit register means for storing said certain number;

command counter means responsive to said command signals for storing a count value representing the number of command signals which have occurred; and comparator means responsive to said limit register means and said command counter means for producing said control signal when said command count value is equal to said certain number.

3. The invention as claimed in claim 2 wherein said sensing means includes:

criteria register means for storing said predetermined value; and comparator means responsive to said error counter means and said criteria register means for producing said value signal while the error count value is not less than said predetermined value.

4. The invention as claimed in claim 3 including:

means responsive to said control signal for resetting said command counter and said error counter.

* * * * *